(12) United States Patent
Kondou

(10) Patent No.: US 7,825,175 B2
(45) Date of Patent: Nov. 2, 2010

(54) NATURAL RUBBER LATEX, NATURAL RUBBER, RUBBER COMPOSITION AND TIRE USING THE SAME

(75) Inventor: Hajime Kondou, Kodaira (JP)

(73) Assignee: Bridgestone Corporation, Tokyo (JP)

(*) Notice: Subject to any disclaimer, the term of this patent is extended or adjusted under 35 U.S.C. 154(b) by 717 days.

(21) Appl. No.: 10/513,431

(22) PCT Filed: Dec. 8, 2003

(86) PCT No.: PCT/JP03/15673

§ 371 (c)(1), (2), (4) Date: Nov. 4, 2004

(87) PCT Pub. No.: WO2004/052935

PCT Pub. Date: Jun. 24, 2004

(65) Prior Publication Data

US 2005/0234186 A1  Oct. 20, 2005

(30) Foreign Application Priority Data

Dec. 6, 2002 (JP) .............................. 2002-355796

(51) Int. Cl.
C08L 89/00 (2006.01)
(52) U.S. Cl. .............................. 524/17; 524/18; 524/145
(58) Field of Classification Search ................... 524/17, 524/18, 145
See application file for complete search history.

(56) References Cited

U.S. PATENT DOCUMENTS

| 5,998,512 A | 12/1999 | Schloman et al. |
| 6,265,479 B1 | 7/2001 | Ichikawa et al. |
| 2006/0036025 A1* | 2/2006 | Ichikawa et al. ......... 524/575.5 |

FOREIGN PATENT DOCUMENTS

| EP | 0 584 597 A1 | 3/1994 |
| EP | 1 149 902 A | 10/2001 |
| JP | 06-056902 A | 3/1994 |
| JP | 06-056906 A | 3/1994 |
| JP | 06-329838 A | 11/1994 |
| JP | 2001-81107 A | 3/2001 |
| JP | 2002-348409 A | 12/2002 |
| WO | WO 00/61711 | 10/2000 |

* cited by examiner

*Primary Examiner*—Peter D Mulcahy
(74) *Attorney, Agent, or Firm*—Sughrue Mion, PLLC

(57) ABSTRACT

The natural rubber latex of the present invention in which phospholipid contained in the latex is decomposed, particularly the natural rubber latex in which it is decomposed by enzyme treatment with lipase and/or phospholipase at a temperature of 70° C. or lower is excellent in a processability, and in the natural rubber thereof and the rubber composition using the same, the physical properties such as an anti-aging characteristic, a tensile strength and an abrasion resistance are sufficiently maintained. Accordingly, the natural rubber of the present invention can be used as an excellent member for a tire.

7 Claims, No Drawings

NATURAL RUBBER LATEX, NATURAL RUBBER, RUBBER COMPOSITION AND TIRE USING THE SAME

TECHNICAL FIELD

The present invention relates to natural rubber latex, natural rubber, a rubber composition thereof and a tire using the same, and it further relates to a production process for such natural rubber.

BACKGROUND ART

In general, natural rubber is frequently used in many fields including industrial products such as tires, rubber belts, rubber rolls, bladders and fenders and sporting goods such as tennis balls, basketballs, soccer balls and volleyballs. In a tire, it is used as a material for various components constituting rubber tires, such as treads, side walls, ply coating rubbers and bead fillers.

In recent years, it has become apparent that protein contained in natural rubber is a cause to bring about an allergic symptom, and a lot of deprotenizing techniques have been proposed.

Natural rubber is more excellent in mechanical characteristics than synthetic rubber and has low so-called tan δ (dynamic loss factor). Accordingly, natural rubber is excellent in a low hysteresis loss property, but it is desired to be improved in a gripping property in a wet state. Further, crude natural rubber (rubber used as a raw material) is inferior in processability and a productivity in the production. This is because protein and phospholipid are bonded to a molecular end of natural rubber, so that proteins themselves and phospholipids themselves are further bonded and associated to form a higher order branched structure. In order to solve such problem, a deprotenizing technique in which a total nitrogen content of natural rubber is reduced to 0.1 mass % or less has been proposed (refer to Japanese Patent Application Laid-Open No. 329838/1994). In conventional deprotenizing treatments, natural rubber latex is repeatedly washed with surfactants, and washing thereof is accompanied with centrifugal process. Further, it is carried out to add a proteolytic enzyme to natural rubber latex to decompose protein and then repeatedly wash it with a surfactant, and protease originating in a bacteria is preferably used as the proteolytic enzyme (refer to Japanese Patent Application Laid-Open No. 56902/1994 and Japanese Patent Application Laid-Open No. 56906/1994).

For example, anionic surfactants and/or nonionic surfactants can be used as a surfactant for deprotenizing treatment. The anionic surfactants include, for example, surfactants of a carboxylic acid base, a sulfonic acid base, a sulfate base and a phosphate base.

On the other hand, it is possible to reduce a branch degree of a higher-order branched structure to improve a processability of natural rubber. However, if a deprotenizing technique is used to completely remove protein, a large part of non-rubber components including protein is removed as well, and the satisfactory processability-improving effect can not be obtained. This reduces an aging resistance of a natural rubber. Further, complete deprotenization reduces entanglement of the molecules themselves originating in a polypeptide bond and the apparent molecular weight to a large extent, which results in reducing the tensile force and the abrasion resistance.

DISCLOSURE OF THE INVENTION

An object of the present invention is to provide a natural rubber latex having an excellent processability, natural rubber which is sufficiently maintained in physical properties such as an aging resistance, a tensile force and an abrasion resistance, a production process for the same and a rubber composition and a tire using such natural rubber.

The present inventor decomposed a prescribed bond and an associated part of a branch end, that is, a phospholipid in a higher-order branched structure of natural rubber latex. To be specific, lipase and/or phospholipase enzyme treatment was carried out to try modification of natural rubber such as shortening in stress relaxation time to find that natural rubber was improved in a processability without bringing about a reduction in the physical properties of the natural rubber, and he has come to reach the present invention.

Further, he has found as well that if natural rubber latex is subjected to treatment with protease in combination with such enzyme treatment with lipase and phospholipase, the latex is observed to be further improved in a processability, and he has come to reach the present invention.

That is, the natural rubber latex, the natural rubber and the rubber composition and the tire using the same according to the present invention are characterized by comprising the constitutions and the processes of the following items (1) to (15) and thus solve the problems described above.

(1) A natural rubber latex in which phospholipid contained in the latex is decomposed.

(2) The natural rubber latex as described in the above item (1), wherein enzyme treatment with lipase and/or phospholipase is carried out in the decomposition.

(3) The natural rubber latex as described in the above item (2), wherein an addition amount of the lipase and/or the phospholipase falls in a range of 0.005 to 0.5 mass part per 100 mass parts of the latex solid component.

(4) The natural rubber latex as described in the above items (2) or (3), wherein enzyme treatment with protease is carried out.

(5) The natural rubber latex as described in any of the above items (2) to (4), wherein the enzyme treatment is carried out at a temperature of 70° C. or lower.

(6) The natural rubber latex as described in any of the above items (2) to (5), wherein treatment with a surfactant is carried out in addition to the enzyme treatments.

(7) A natural rubber obtained from the natural rubber latex as described in any of the above items (1) to (6).

(8) The natural rubber as described in the above item (7), wherein a Mooney viscosity ($ML_{1+4}$) and a stress relaxation time $T_{80}$ of the above rubber satisfy the relation of $T_{80}<0.0035\exp(ML_{1+4}/8.2)+20$ in a range of $40<ML_{1+4}<100$ (provided that $ML_{1+4}$ is a measured value at a temperature of 100° C., and $T_{80}$ is time (second) spent until the value of $ML_{1+4}$ is reduced by 80%, that is, reduced to 20% since rotation of a rotor is stopped immediately after measurement of $ML_{1+4}$).

(9) A rubber composition using the natural rubber as described in the above items (7) or (8).

(10) A tire characterized by using the rubber composition as described in the above item (9).

(11) A production process for natural rubber, wherein it is produced by subjecting natural rubber latex to enzyme treatment with lipase and/or phospholipase.

(12) The production process for natural rubber as described in the above item (11), wherein the enzyme treatment is carried out by adding lipase and/or phospholipase in an amount falling in a range of 0.005 to 0.5 mass part per 100 mass parts of the latex solid component.

(13) The production process for natural rubber as described in the above items (11) or (12), wherein enzyme treatment with protease is carried out in addition to the enzyme treatment described above.

(14) The production process for natural rubber as described in any of the above items (11) to (13), wherein the enzyme treatment above is carried out at a temperature of 70° C. or lower.

(15) The production process for natural rubber as described in any of the above items (11) to (14), wherein treatment with a surfactant is carried out in addition to the enzyme treatment.

As described above, in the present invention, phospholipid is partially or selectively decomposed at a branched part of natural rubber latex, and the non-rubber component can be allowed to remain. One of the mechanisms for improving the processability includes shortening in stress relaxation time of natural rubber. Selective phospholipid decomposition of natural rubber latex in the present invention shortens stress relaxation time of natural rubber. Accordingly, the natural rubber and the rubber composition using the same are improved in a process-ability thereof (a shrinking property and a dimensional stability) and can sufficiently maintain an anti-aging property, a tensile strength and an abrasion resistance. The stress relaxation time referred to herein is substituted with $T_{80}$ in contrast with $ML_{1+4}$ of Mooney viscosity measurement, and this value has to satisfy the range described in the item (8).

BEST MODE FOR CARRYING OUT THE INVENTION

The natural rubber latex, the natural rubber, the rubber composition, the tire using the same and the production process for natural rubber according to the present invention shall be described below in details. However, the present invention shall not be restricted to the following embodiments.

In the natural rubber latex according to the present invention, phospholipid contained in the latex is decomposed. Natural rubber latex used as the raw material means field latex obtained from natural rubber trees, and either of an ammonia-treated latex which is commercially available and a fresh field latex can be used for the latex.

Usually, protein and phospholipid are bonded to a molecular end of such natural rubber, and it is estimated that proteins themselves and phospholipids themselves at the end thereof are further bonded and associated to form a higher-order branched structure. It is estimated, however, that in natural rubber latex in which phospholipid is decomposed, the phospholipid is decomposed in a branch point of such higher-order branched structure, whereby the branch degree is reduced. If the branch degree is reduced, processability of natural rubber is sufficiently improved. If the higher-order branched structure is completely decomposed, that is, protein is completely removed, a large part of non-rubber components including protein is removed, and the aging resistance and the abrasion resistance are reduced. In contrast with this, a rubber obtained by using natural rubber latex in which phospholipid forming the branch described above is convergently decomposed is not observed to be reduced in anti-aging property and abrasion resistance to a large extent.

Natural rubber latex which is subjected to enzyme treatment with lipase and/or phospholipase can be given as the natural rubber latex in which phospholipid is decomposed according to the present invention.

The lipase and/or phospholipase described above shall not specifically be restricted, and any of those originating in bacteria, hyphomycetes and yeast can be used. Enzyme activity of Lipase and phospholipase is 100 (U/g) or more, preferably 1000 (U/g) or more, more preferably 10000 (U/g) or more and further preferably 100000 (U/g) or more. Lipase M "Amano" 10 (product manufactured by Amano Enzyme Co., Ltd.), Lipase OF (product manufactured by Meito Co., Ltd.) and Phospholipase A1 (product manufactured by Sankyo Co., Ltd.) which are commercial products can be given as such lipase and phospholipase.

An addition amount of the lipase and phospholipase described above in such enzyme treatment falls in a range of preferably 0.005 to 0.5 mass part, particularly preferably 0.01 to 0.2 mass part per 100 mass parts of the solid component contained in the natural rubber latex. If the addition amount falls in the range described above, phospholipid contained in the natural rubber latex is suitably decomposed, and the processability and the good physical properties which are the objects are maintained.

If an addition amount (total amount) of the lipase and/or the phospholipase described above is less than 0.005 mass part, the decomposition reaction of phospholipid is unsatisfactory, and the improving effect of the processability is not sufficiently obtained. If an addition amount (total amount) of the lipase and/or the phospholipase described above exceeds 0.5 mass part, almost all of fatty acids contained in the natural rubber are decomposed, and the strain induced crystallinity is reduced, so that the tensile strength and the abrasion resistance are reduced.

The natural rubber latex according to the present invention may further be subjected to enzyme treatment with protease in addition to lipase and/or phospholipase.

The protease described above shall not specifically be restricted as is the case with lipase and phospholipase, and any of those originating in bacteria, hyphomycetes and yeast can be used. Enzyme activity of protease is 100 (U/g) or more, preferably 1000 (U/g) or more, more preferably 10000 (U/g) or more and further preferably 100000 (U/g) or more. Alkalase 2.5 L-type DX (manufactured by Novozymes Co., Ltd.) and Proleather FG-F (manufactured by Amano Enzyme Co., Ltd.) which are commercial products can be given as such protease.

An addition amount of the protease in such enzyme treatment falls in a range of preferably 0.005 to 0.5 mass part, particularly preferably 0.01 to 0.2 mass part per 100 mass parts of the solid component contained in the natural rubber latex.

If the addition amount falls in the range described above, protein contained in the natural rubber latex is suitably decomposed, and the processability which is the object is further improved. Further, the good physical properties are maintained. If an addition amount of the protease is less than the range described above, the decomposition reaction of the protein is unsatisfactory, and therefore it is not preferred. On the other hand, if the addition amount exceeds the range described above, the decomposition reaction of the protein proceeds too much, and the targeted processability is not balanced with the physical properties.

In the present invention, peptidase, cellulase, pectinase, esterase and amylase in addition to the enzymes described above can be used in combination.

Also, in adding such enzymes, capable of being used are other additives, for example, phosphates such as monopotassium phosphate, dipotassium phosphate and sodium phosphate, acetates such as potassium acetate and sodium acetate, acids such as sulfuric acid, acetic acid, hydrochloric acid, citric acid and succinic acid or salts thereof, ammonia, sodium hydroxide, potassium hydroxide, sodium carbonate and sodium hydrogencarbonate.

In the present invention, the enzyme treatment described above is carried out at a temperature of 70° C. or lower, preferably 60° C. or lower and more preferably 50° C. or lower.

If the enzyme treatment temperature described above exceeds 70° C., the natural rubber latex is reduced in a stability and coagulated during the enzyme treatment. After coagulation, the decomposing effect with the enzyme is reduced. This makes it difficult to produce the natural rubber.

The natural rubber latex according to the present invention is preferably treated while using a surfactant in combination with the enzyme treatment described above. Nonionic surfactants, anionic surfactants, cationic surfactants and amphoteric surfactants can be used as the surfactant, and nonionic surfactants and anionic surfactants are particularly preferably used.

Suitable as the nonionic surfactants are, for example, polyoxyalkylene ether base, polyoxyalkylene ester base, polyhydric alcohol fatty acid ester base, saccharide fatty acid ester base and alkylpolyglycoside base.

Suitable as the anionic surfactants are, for example, carboxylic acid base, sulfonic acid base, sulfate base and phosphate base.

The carboxylic acid base surfactants include, for example, fatty acid salts, polyvalent carboxylic acid salts, rosin acid salts, dimer acid salts, polymer acid salts and tall oil fatty acid salts. The sulfonic acid base surfactants include, for example, alkylbenzenesulfonates, alkylsulfonates, alkylnaphthalenesulfonates, naphthalenesulfonates and diphenylethersulfonates. The sulfate base surfactants include, for example, alkylsulfate salts, polyoxyalkylenealkylsulfate salts, polyoxyalkylenealkylphenylethersulfates, tristyrenated phenol sulfate salts and polyoxyalkylenedistyrenated phenol sulfate salts. The phosphate base surfactants include alkylphosphate salts and polyoxyalkylenephosphate salts.

The natural rubber latex subjected to the enzyme treatment in the manner described above is coagulated without completely separating the non-rubber components. If separating the non-rubber components, the anti-aging property is inferior. A rubber component obtained by coagulating the treated latex described above is washed and then dried by means of a conventional dryer such as a vacuum dryer, an air dryer and a drum dryer, whereby the natural rubber according to the present invention can be obtained.

In the natural rubber latex described above, a Mooney viscosity ($ML_{1+4}$) and a stress relaxation time $T_{80}$ satisfy the relation of $T_{80} < 0.0035 \exp(ML_{1+4}/8.2) + 20$ in a range of $40 < ML_{1+4} < 100$ Provided that $ML_{1+4}$ is a measured value at a temperature of 100° C., and $T_{80}$ is time (second) spent until the value of $ML_{1+4}$ is reduced by 80% since rotation of a rotor is stopped immediately after measurement of $ML_{1+4}$.

The natural rubber latex in which $T_{80}$ and $ML_{1+4}$ described above fall in the ranges described above is sufficiently small in a Mooney viscosity and a stress relaxation time, and therefore the processability is enhanced.

In the rubber composition using such natural rubber according to the present invention, at least 5 mass % of the natural rubber described above based on the whole rubber components is preferably contained therein. If this amount is less than 5 mass %, the rubber composition having the desired physical properties is not obtained in a certain case. The preferred content of this natural rubber is 10 mass % or more.

The rubber component used in combination with the natural rubber described above includes conventional natural rubbers and diene base synthetic rubbers, and the diene base synthetic rubber includes, for example, a styrene-butadiene copolymer (SBR), polybutadiene (BR), polyisoprene (IR), a butyl rubber (IIR), an ethylene-propylene copolymer and mixtures thereof.

A filler blended in the rubber component of the present invention shall not specifically be restricted, and capable of being used are compounds usually used in the rubber industry such as carbon black, silica, alumina, aluminum hydroxide, clay and calcium carbonate. Capable of being used as carbon black are, for example, carbon blacks of various grades such as SAF, HAF, ISAF, FEF and GPF. Further, silica shall not specifically be restricted, and wet silica, dry silica and colloidal silica are preferred. Such fillers can be used alone or in a mixture of two or more kinds thereof.

The total blending amount of such fillers falls in a range of preferably 30 to 120 mass parts, more preferably 40 to 80 mass parts per 100 mass parts of the rubber component.

The rubber component of the present invention can contain, if desired, various chemicals usually used in the rubber industry, for example, vulcanizing agents, vulcanization accelerator, process oils, antioxidants, scorching retarder, zinc oxide and stearic acid as long as the objects of the present invention are not damaged.

The rubber composition of the present invention can be used as well for uses in industrial products such as rubber cushions, belts, hoses and others. In particular, it can suitably be used as a rubber for tires and can be applied to every tire member such as, for example, a tread rubber (including a cap rubber and a base rubber), a side wall, a ply coating rubber and a bead filler rubber.

EXAMPLES

The present invention shall be explained with reference to examples, but the constitution of the present invention shall not be restricted to the following examples.

Production Process for Natural Rubber

Production Example 1

(1) Enzyme treating step of natural rubber latex

Levenol WX (sodium polyoxyethylenealkylethersulfate: manufactured by Kao Corporation) 1.5 g as a surfactant was added to 1000 g of latex obtained by adding water to natural rubber latex treated with clonal specie GT-1 and 0.4 wt % of $NH_3$ to control a solid content to 15 wt %, and the latex was stirred and dispersed. Next, 0.15 g of lipase (Lipase M "Amamo" 10: manufactured by Amano Enzyme Co., Ltd.) was added thereto, stirred and dispersed, and then the latex was left standing still for 15 hours.

(2) Coagulating and drying step

Next, formic acid was added to control pH of the latex to 4.7 to thereby coagulate the latex. This solid matter was subjected five times to a craper and passed through a shredder to be turned into a crumb, followed by drying at 110° C. for 210 minutes by means of a hot air dryer, whereby a natural rubber A was obtained.

Production Examples 2 to 6

Lipase OF (manufactured by Meito Co., Ltd.) 0.15 g was added in Production Example 2 instead of adding Lipase M "Amamo" 10 described above in Production Example 1 to produce natural rubber. The natural rubber thus obtained was designated as B. In Production Example 3, Phospholipase A1 (manufactured by Sankyo Co., Ltd.) 0.15 g was added instead of adding Lipase M "Amamo" 10 to produce a natural rubber. The natural rubber thus obtained was designated as C. In Production Example 4, 0.03 g of Lipase M "Amamo" 10 was added to produce a natural rubber. The natural rubber thus obtained was designated as D. In Production Example 5, a protease enzyme ("Alkarase 2.5 L, type X", manufactured by Novozymes Co., Ltd.) 0.15 g in addition to Lipase M "Amamo" 10 used in Production Example 1 was further added to produce a natural rubber. The natural rubber thus obtained was designated as E. In Production Example 6, a protease enzyme ("Proleather FG-F", manufactured by Amano Enzyme Co., Ltd.) 0.15 g in addition to Lipase M "Amamo" 10 used in Production Example 1 was further added to produce a natural rubber. The natural rubber thus obtained was designated as F.

Comparative Production Examples 1 to 3

In Comparative Production Example 1, only the protease enzyme ("Alkarase 2.5 L, type X", manufactured by Novozymes Co., Ltd.) 0.15 g was added in place of Lipase M "Amamo" 10 used in Production Example 1 to produce a natural rubber. The natural rubber thus obtained was designated as G.

In Comparative Production Example 2, the protease enzyme ("Proleather FG-F", manufactured by Amano Enzyme Co., Ltd.) 0.15 g was used in place of Lipase M "Amamo" 10 used in Production Example 1 to produce natural rubber. The natural rubber thus obtained was designated as H.

In Comparative Production Example 3, natural rubber latex was directly coagulated and dried without passing through the enzyme treating step of the latex to produce natural rubber. The natural rubber thus obtained was designated as I.

Production Examples 7 to 8

In Production Example 7, 0.005 g of Lipase M "Amamo" 10 used in Production Example 1 was added to produce natural rubber. The natural rubber thus obtained was designated as J. In Production Example 8, 1.00 g of Lipase M "Amamo" 10 used in Production Example 1 was added to produce natural rubber. The natural rubber thus obtained was designated as K.

Reference Production Example 1

In Reference Production Example 1, natural rubber was prepared in the same manner as in Production Example 1, except that a natural rubber latex was treated in a water bath at a temperature of 80° C. in the enzyme treatment. The natural rubber thus obtained was designated as L.

The molecular weights and the Mooney viscosity ($ML_{1+4}$, 100° C.) of the respective natural rubbers are shown in the following Table 1.

TABLE 1

| | Sample name | Enzyme name | | Treating temperature (° C.) | Molecular weight (Mw) | $ML_{1+4}$ (100° C.) | $T_{80}$ (sec) |
|---|---|---|---|---|---|---|---|
| Production Example 1 | A | Lipase M "Amamo" 10 (0.15 g) | | 25 | 1390000 | 71 | 21.4 |
| Production Example 2 | B | Lipase OF (0.15 g) | | 25 | 1510000 | 73 | 22.7 |
| Production Example 3 | C | Phospholipase A1 (0.15 g) | | 25 | 1370000 | 72 | 20.3 |
| Production Example 4 | D | Lipase M "Amamo" 10 (0.03 g) | | 25 | 1340000 | 69 | 18.5 |
| Production Example 5 | E | Lipase M "Amamo" 10 (0.15 g) | Alkarase 2.5 L (0.15 g) | 25 | 1250000 | 69 | 15.2 |
| Production Example 6 | F | Lipase M "Amamo" 10 (0.15 g) | Proleather FG-F (0.15 g) | 25 | 1280000 | 68 | 16.1 |
| Comparative Production Example 1 | G | — | Alkarase 2.5 L (0.15 g) | 25 | 1270000 | 69 | 32.4 |
| Comparative Production Example 2 | H | — | Proleather FG-F (0.15 g) | 25 | 1300000 | 68 | 31.6 |
| Comparative Production Example 3 | I | — | | 25 | 1620000 | 78 | 78.5 |
| Production Example 7 | J | Lipase M "Amamo" 10 (0.05 g) | | 25 | 1590000 | 77 | 70.9 |
| Production Example 8 | K | Lipase M "Amamo" 10 (1.0 g) | | 25 | 1130000 | 62 | 13.7 |
| Reference Production Example 1 | L | Lipase M "Amamo" 10 (0.15 g) | | 80 | 1510000 | 75 | 62.3 |

The respective natural rubbers described above were used to prepare rubber compositions in compositions shown in the following Table 2, and the rubber compositions thus prepared were vulcanized on the conditions of temperature of 145° C. and 33 minutes to obtain experimental rubbers.

TABLE 2

| Respective components of rubber compositions | Mass part |
|---|---|
| Natural rubber (respective examples) | 100 |
| Carbon black N339 | 50 |

TABLE 2-continued

| Respective components of rubber compositions | Mass part |
|---|---|
| Aromatic oil | 5 |
| Stearic acid | 2 |
| Antioxidant 6C (*1) | 1 |
| Zinc oxide | 3 |
| Vulcanization accelerator DZ (*2) | 0.8 |
| Sulfur | 1 |

(*1) Antioxidant 6C: N-phenyl-N-1,3-dimethylbutyl-p-phenylenediamine
(*2) Vulcanization accelerator DZ: N,N-dicyclohexyl-2-benzothiazolysulfenamide The characteristics of the respective experimental rubbers were measured and evaluated by the following methods, and the results thereof are shown in Table 3.

Evaluation Methods
(1) Mooney viscosity of natural rubber
The Mooney viscosity ($ML_{1+4}/100°$ C.) was measured at 100° C. according to JIS K6300-1994.
(2) Mooney viscosity of compound (rubber composition)
The Mooney viscosity ($ML_{1+4}/130°$ C.) was measured at 130° C. according to JIS K6300-1994. The smaller this value is, the more excellent the processability is.
(3) Physical properties
(a) Shrinking property
An uncured rubber was wound on a 3 inch roll at a temperature of 70° C. at a roll interval of 2 mm to rotate the roll for 2 minutes. Then, the roll was stopped rotating and left standing for one minute, and a line of 6 cm was cut thereon. After left standing for 3 minutes, a shrinking degree of the line of 6 cm was measured and shown by an index, wherein Comparative Production Example 3 was a control (100). The smaller the numerical value is, the better the shrinking property is.
(b) Tensile strength
The strength (Tb) in breaking was measured according to JIS K6301-1995.
(c) tan δ (loss factor)
A viscoelasticity-measuring apparatus (manufactured by Rheometrix Co., Ltd.) was used to measure tan δ (50° C.) at a temperature of 50° C., a distortion of 5% and a frequency of 15 Hz. The smaller the tan δ (50° C.) is, the lower the hysteresis loss property is.
(c) Abrasion resistance
A Lambourn type abrasion tester was used to measure an abrading amount at a slipping rate of 60% at room temperature and shown by an index, wherein Comparative Production Example 3 was a control (100). The smaller the numerical value is, the better the abrasion resistance is.

TABLE 3

| | Natural rubber used | $ML_{1+4}$ (130° C.) | Contraction index | Tb (MPa) | tan δ | Abrasion resistance index |
|---|---|---|---|---|---|---|
| Example 1 | A | 55 | 72 | 27.1 | 0.191 | 103 |
| Example 2 | B | 58 | 77 | 27.5 | 0.190 | 103 |
| Example 3 | C | 56 | 71 | 27.3 | 0.193 | 101 |
| Example 4 | D | 54 | 72 | 27.2 | 0.193 | 100 |
| Example 5 | E | 52 | 69 | 27.6 | 0.197 | 101 |
| Example 6 | F | 52 | 70 | 27.2 | 0.196 | 102 |
| Comparative Example 1 | G | 53 | 84 | 27.6 | 0.192 | 103 |
| Comparative Example 2 | H | 56 | 87 | 27.4 | 0.193 | 103 |
| Comparative Example 3 | I | 65 | 100 | 27.3 | 0.196 | 100 |
| Example 7 | J | 64 | 100 | 27.4 | 0.194 | 100 |
| Example 8 | K | 48 | 65 | 25.2 | 0.201 | 92 |
| Reference Example 1 | L | 63 | 99 | 27.6 | 0.196 | 99 |

In Examples 1 to 6 in the present invention, the abrasion resistance indices are excellent as compared with those in Comparative Examples 1 to 3 without reducing the breaking physical property, the low heat-generating property and the abrasion resistance.

Further, they are low as well in a compound Mooney viscosity and excellent in a processability as compared with Comparative Example 3.

INDUSTRIAL APPLICABILITY

As described above, the natural rubber latex and the natural rubber according to the present invention are shortened in a stress relaxation time and improved in a processability because phospholipid is decomposed. Further, in a rubber composition using such natural rubber, for example, a tire, the physical properties such as an aging resistant characteristic, a tensile strength and an abrasion resistance are sufficiently maintained, and the industrial applicability thereof is enhanced.

What is claimed is:
1. A natural rubber latex in which phospholipid contained in the latex is decomposed, the natural latex produced by the process comprising:
   subjecting the natural rubber latex to enzyme treatment with lipase and/or phospholipase, and wherein enzyme treatment with protease is also carried out,
   wherein an addition amount of the lipase and/or the phospholipase falls in a range of 0.005 to 0.5 mass part per 100 mass parts of the latex solid component and an addition amount of the protease falls in a range of 0.005 to 0.5 mass part per 100 mass parts of the latex solid component.
2. The natural rubber latex as described in claim 1, wherein the enzyme treatment is carried out at a temperature of 70° C. or lower.
3. The natural rubber latex as described in claim 1, wherein treatment with a surfactant is carried out in addition to the enzyme treatments.
4. A natural rubber obtained from the natural rubber latex as described in claim 1.
5. The natural rubber as described in claim 4, wherein a Mooney viscosity ($ML_{1+4}$) and a stress relaxation time $T_{80}$ of the above rubber satisfy the relation of $T_{80} < 0.0035 \exp(ML_{1+4}/8.2) + 20$ in a range of $40 < M_{1+4} < 100$ (provided that $ML_{1+4}$ is a measured value at a temperature of 100° C., and $T_{80}$ is time (second) spent until the value of $ML_{1+4}$ is reduced by 80% since rotation of a rotor is stopped immediately after measurement of $ML_{1+4}$).
6. A rubber composition using the natural rubber as described in claim 4.
7. A tire characterized by using the rubber composition as described in claim 6.

* * * * *